(12) United States Patent
Perry et al.

(10) Patent No.: US 11,644,475 B2
(45) Date of Patent: May 9, 2023

(54) SAMPLE RACK FOR SAMPLE ANALYSIS SYSTEM

(71) Applicant: Siemens Healthcare Diagnostics Inc., Tarrytown, NY (US)

(72) Inventors: William Perry, Sharon, MA (US); Michael Chen, Sharon, MA (US); Steven Geehan, Braintree, MA (US); Gyula Hojer, Telki (HU); Norbert Laszka, Budapest (HU)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 385 days.

(21) Appl. No.: 16/609,559

(22) PCT Filed: May 8, 2018

(86) PCT No.: PCT/US2018/031566
§ 371 (c)(1),
(2) Date: Oct. 30, 2019

(87) PCT Pub. No.: WO2018/208757
PCT Pub. Date: Nov. 15, 2018

(65) Prior Publication Data
US 2020/0064362 A1  Feb. 27, 2020

Related U.S. Application Data

(60) Provisional application No. 62/504,125, filed on May 10, 2017.

(51) Int. Cl.
*G01N 35/02* (2006.01)
*B01L 9/06* (2006.01)
*G01N 35/04* (2006.01)

(52) U.S. Cl.
CPC .............. *G01N 35/026* (2013.01); *B01L 9/06* (2013.01); *G01N 35/04* (2013.01); *G01N 2035/0415* (2013.01)

(58) Field of Classification Search
CPC ................. G01N 35/026; G01N 35/04; G01N 2035/0415; G01N 2035/046; B01L 9/06; (Continued)

(56) References Cited

U.S. PATENT DOCUMENTS 6,065,617 A   5/2000  Cohen et al.
6,444,472 B1  9/2002  Cohen et al.
(Continued)

FOREIGN PATENT DOCUMENTS

WO  WO-2015126839 A1 *  8/2015  ......... G01N 35/1016

OTHER PUBLICATIONS

International Search Report and Written Opinion of International Application No. PCT/US2018/031566 dated Jul. 12, 2018.
(Continued)

*Primary Examiner* — Benjamin R Whatley
*Assistant Examiner* — John McGuirk

(57) ABSTRACT

An embodiment of the disclosure is a rack adapted to engage a rack handler. The rack includes a rack body. The rack body has a bottom, a top opposite the bottom, and a receptacle that extends from the top toward the bottom. The receptacle is sized to receive the sample collection unit. The rack body has a first interior surface that extends from the bottom toward the top, and a second interior surface that extends from the bottom toward the top. The second interior surface is opposite to the first interior surface so as to at least partially define a slot along the bottom. The rack body also includes an interference groove in the slot along at least one
(Continued)

of the first interior surface and the second interior surface. The slot and the interference groove are sized to engage a portion of the rack handler.

18 Claims, 15 Drawing Sheets

(58) Field of Classification Search
CPC .......... B65G 47/244; B65G 2201/0244; B65G 2201/0261
See application file for complete search history.

(56) References Cited

U.S. PATENT DOCUMENTS

| | | |
|---|---|---|
| 7,407,627 B1 | 8/2008 | Rosenberg et al. |
| 2005/0196320 A1 | 9/2005 | Veiner et al. |
| 2010/0049358 A1 | 2/2010 | Koch et al. |
| 2010/0166606 A1 | 7/2010 | Koike et al. |
| 2016/0060680 A1 | 3/2016 | Buse et al. |

OTHER PUBLICATIONS

European Search Report and Search Opinion of European Application No. 18799054.4 dated May 7, 2020.

\* cited by examiner

SAMPLE RACK FOR SAMPLE ANALYSIS SYSTEM

The subject application claims benefit under 35 USC § 119(e) of U.S. provisional Application No. 62/504,125, filed May 10, 2017. The entire contents of the above-referenced patent application are hereby expressly incorporated herein by reference.

TECHNICAL FIELD

The present disclosure relates to a sample rack for a sample analysis system.

BACKGROUND

Diagnostic methods may include testing a sample to measure sample properties and/or to detect substances of interest that may be present in the sample. In the field of urinalysis, urine chemistry and sediments are commonly analyzed. The liquid sample usually contains one or more analytes/particles of interest. For urine chemistry analysis, the presence and concentrations of the analytes of interest in the sample are determinable by an analysis of the color changes undergone by the reagent pads that have been submerged in the liquid sample. For urine sediment analysis, the presence and concentrations of the particles of interest are measured by microscopic image analysis. These analyses may be done manually or using automated test device.

Samples may be presented to the test device via a sample rack that holds multiple sample collection units, e.g. sample tubes. Typically, a conveyor system is used to present the sample rack, containing the sample collection units, to the test device by moving sample racks horizontally along a travel path that has a U-shape. The U-shaped travel path has a first leg that can stage multiple sample racks, a lateral portion adjacent the test device, and a second leg that is parallel to the first leg. The sample racks are staged in the first leg of the travel path and the conveyor system moves the sample rack in a first direction to the lateral portion that is adjacent to the test device. Then, the sample rack is translated laterally into a test position adjacent the test device along that lateral portion. When the test procedure is complete, the conveyor system moves the sample rack again laterally. After the last lateral movement of the sample rack, the conveyor system then moves the sample rack in a second direction along the second leg into an additional staging region.

SUMMARY

An embodiment of the disclosure is a rack adapted to engage a rack handler and to carry a sample collection unit. The rack includes a rack body. The rack body has a bottom, a top opposite the bottom, and a receptacle that extends from the top toward the bottom. The receptacle is sized to receive the sample collection unit. The rack body has a first interior surface that extends from the bottom toward the top and a second interior surface that extends from the bottom toward the top. The second interior surface is opposite to the first interior surface so as to at least partially define a slot along the bottom. The rack body also includes an interference groove in the slot along at least one of the first interior surface and the second interior surface. The slot and the interference groove are sized to engage a portion of the rack handler.

Another embodiment of the present disclosure is a sample analysis system for analyzing a sample. The system comprises a rack handler and a rack having a rack body. The rack body has a bottom, a top opposite the bottom, and a receptacle that extends from the top toward the bottom. The receptacle is sized to receive the sample collection unit. The rack body has a first interior surface that extends from the bottom toward the top and a second interior surface that extends from the bottom toward the top. The second interior surface is opposite to the first interior surface so as to at least partially define a slot along the bottom. The rack body also includes an interference groove in the slot along at least one of the first interior surface and the second interior surface. The slot and the interference groove are sized to engage a portion of the rack handler.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown. In the drawings.

DETAILED DESCRIPTION OF ILLUSTRATIVE EMBODIMENTS

Figure 1:
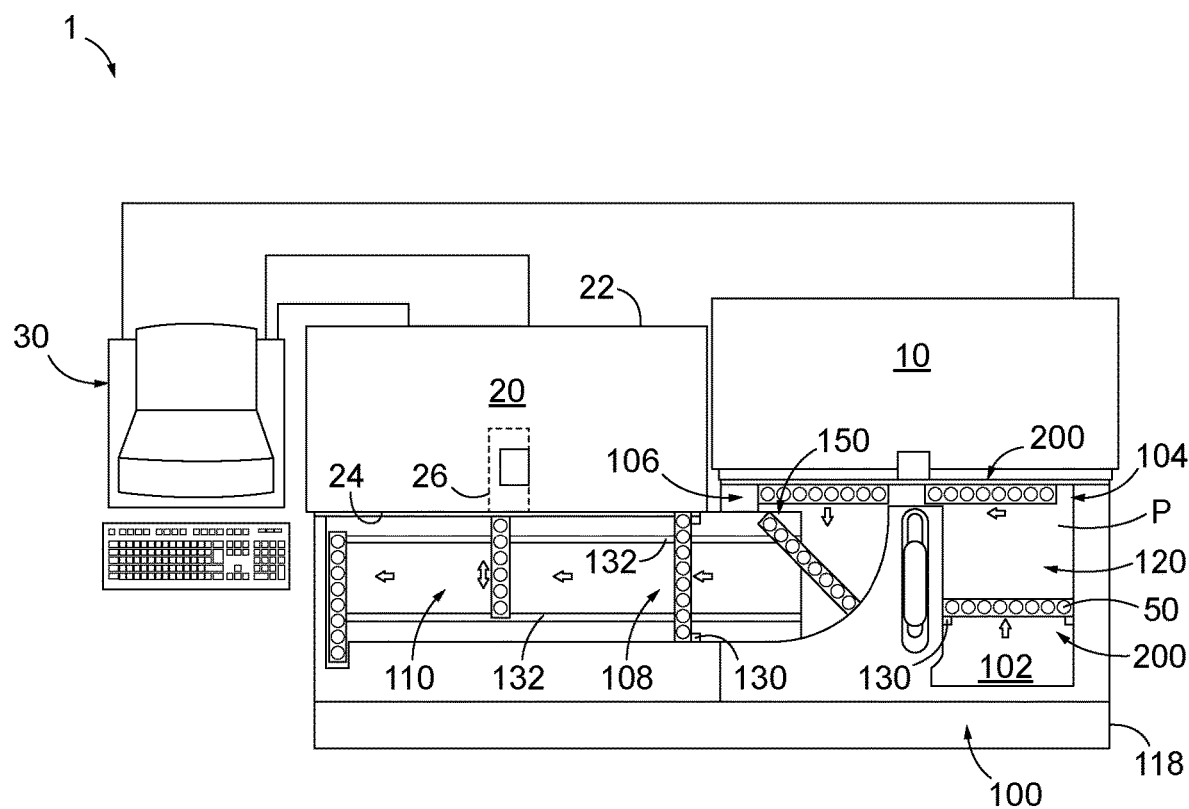
FIG. 1 is a schematic plan view of a sample analysis system according to an embodiment of the present disclosure.

Referring to FIG. 1, embodiments of the present disclosure include a sample analysis system 1 for analyzing samples. The sample analysis system 1 includes one or more test devices 10, 20, a computing device 30 electronically coupled to the test devices 10, 20, a sample rack handler 100, and multiple sample racks 200. The sample racks 200, hold sample collection units 50. Each sample collection unit 50 may contain a sample for testing.

The computing device 30 may be used to control operation of the sample analysis system 1. The computing device 30 may include typical components of a computer, including a memory, one or more processors, a user interface, input/output ports, and various software applications used to run the sample analysis system 1. The computing device 30 may be a separate component as illustrated. Alternatively, the computing device 30 may integrated with either or both test devices 10, 20.

As discussed above, the sample analysis system 1 may include at least one test device, e.g. a first test device 10 and a second device 20. The first and second test devices 10 and 20 are designed to analyze analytes of interest in the sample. In the illustrated embodiment, the first test device 10 is configured to analyze the sample contained in the sample collection unit 50. For example, the test device 10 may include a device, such as a color imager, that determines the color of the sample applied to one or more of the reagent pads on a test strip. Other types of systems may include a spectrophotometer that determines color changes based on reflectance readings, or digital microscope that uses special algorithm to classify particles based the size, shape and texture. Test devices 10 (or 20) may employ a variety of area array detection read-heads utilizing CCD (charge-coupled device), CID (charge-injection device) or PMOS (P-type metal-oxide-semiconductor) detection structures for detecting color changes to the reagent pads. The color changes can be used to determine the presence of analytes of interest. While a spectrophotometer is described above, other systems for testing a sample may be used in the sample analysis system 1 and the present disclosure is not strictly limited to optical based systems.

Multiple test devices 10 and 20 may be used for robust evaluations of samples. If the data obtained by the first test device 10 indicates a need for further analysis, the rack handler 100 conveys the sample rack 200 and sample collection units 50 to the second test device 20. Further tests are performed on the samples by the second test device 20. However, it should be appreciated that the inventive concepts as described herein are not strictly limited to analysis systems that include two or more separate test devices.

Figure 2A:
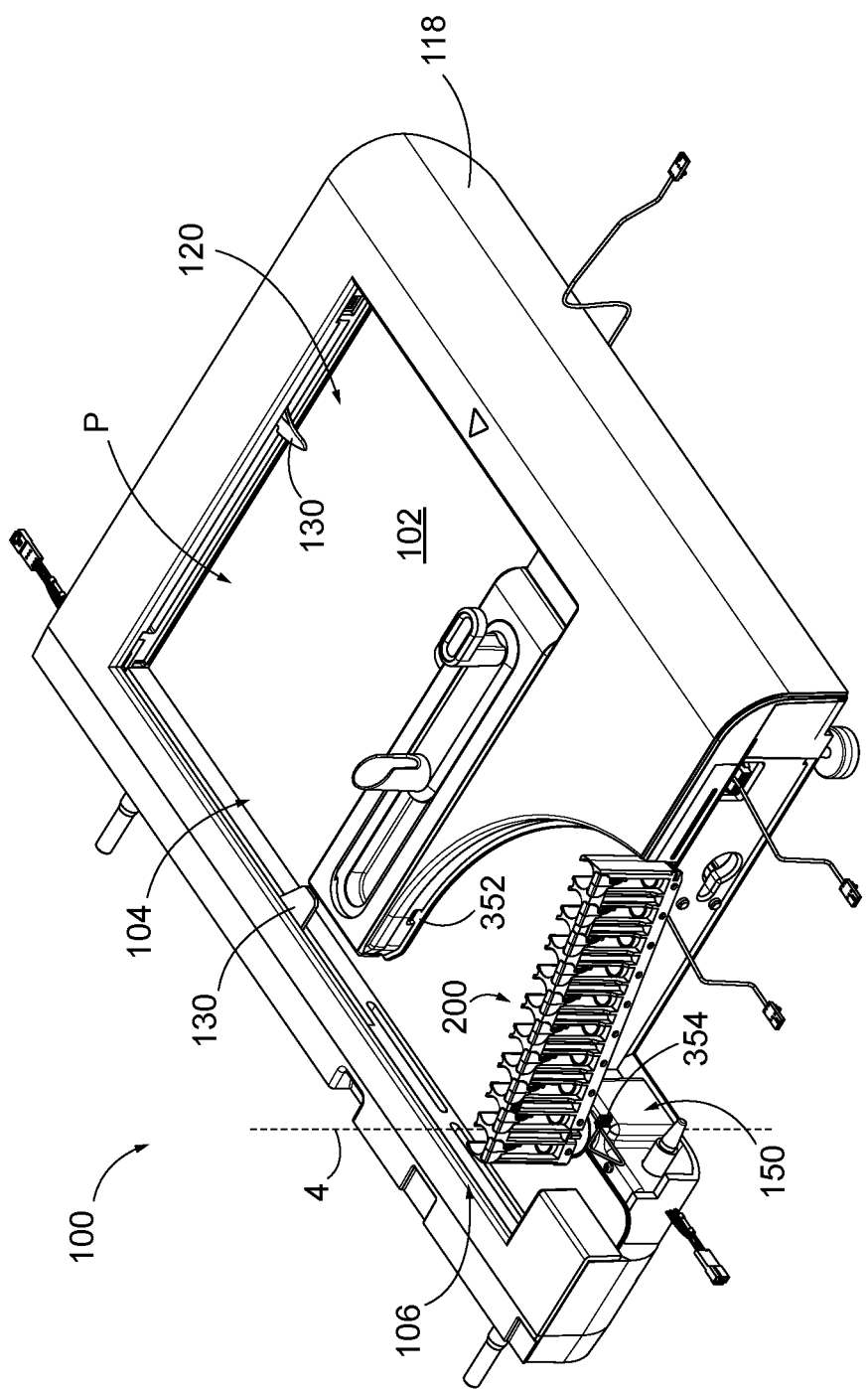
FIG. 2A is a perspective view of a rack handler and sample rack used in the system shown in FIG. 1.

As best shown in FIGS. 1 and 2, the second test device 20 includes a housing 22 and an analyzer (not shown) contained in the housing 22. The housing 22 is coupled to the rack handler 100 and includes front panel near where the rack handler 100 is coupled to the second test device 20. The front panel 24 includes a portal 26 through which the sample rack 200 travels if it is determined that a sample in the sample rack 200 needs further analysis by the second test device 20.

Referring to FIG. 1, the sample rack handler 100 includes a base 118, a transport system 120, and a rotation assembly 150. The sample rack handler 100 defines a travel path P along which the transport system 120 guides the sample racks 200. As illustrated, the sample rack handler 100 includes an input staging region 102 where sample racks 200 to be tested may be staged, a lateral portion 104, a rotation region 106, a travel region 108, and an output staging region 110 where sample racks 200 may be collected once testing is complete. The rack handler 100 as illustrated includes a serpentine travel path P. It should be appreciated that the inventive concepts disclosed herein are not limited to the specific travel path shown. Accordingly, the sample rack handler 100 as disclosed herein may be used with any type of sample analysis system that needs to move a sample rack from one location to another location and may need to change the orientation of the sample rack from one orientation to another orientation.

Figure 2B:
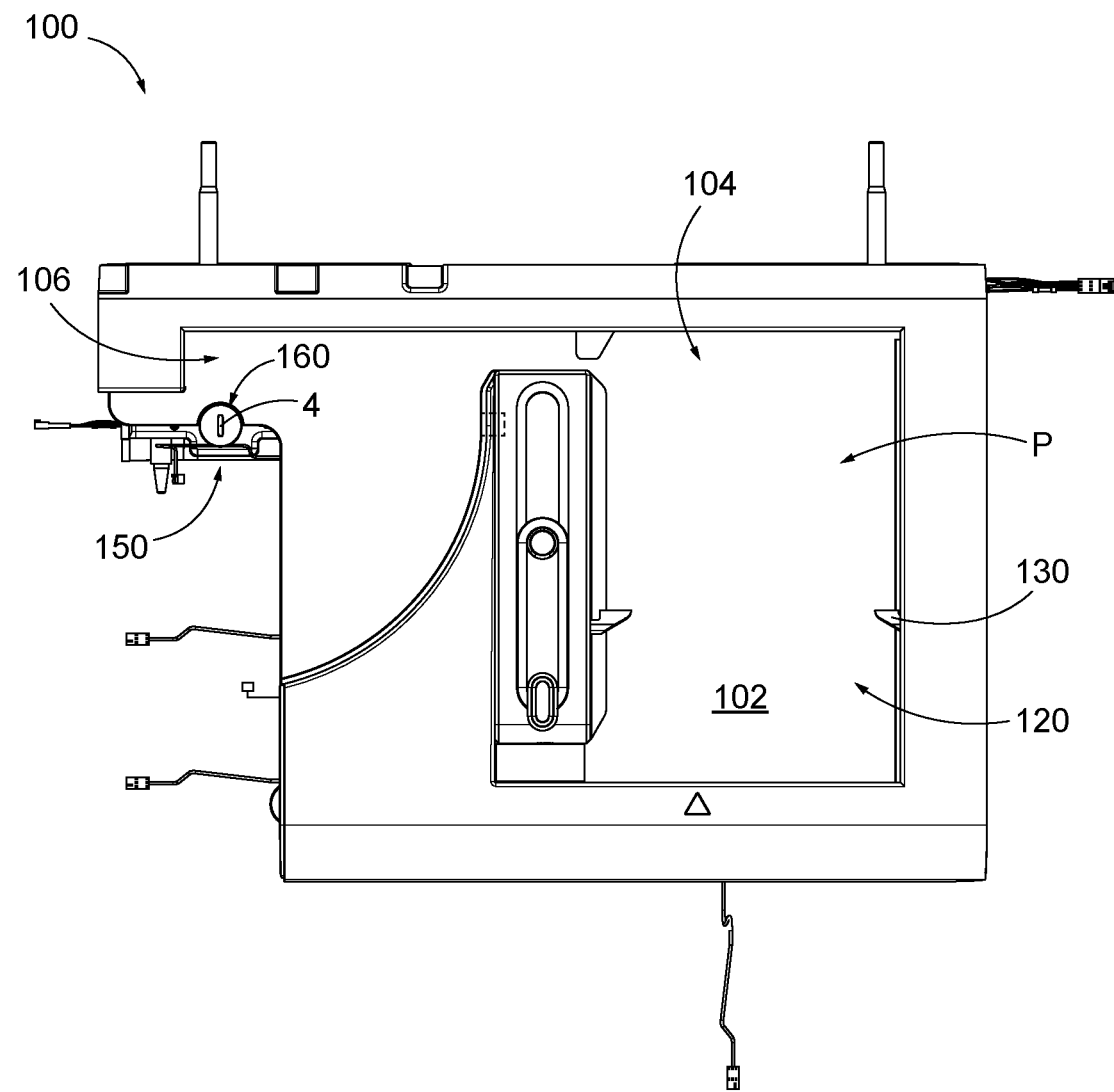
FIG. 2B is a top plan view of the rack handler shown in FIG. 2A.

The transport system 120 can hold and convey multiple sample racks 200 along the travel path P from the input staging region 102 to the first test device 10, from the first test device 10 to the second test device 20, and further into the output staging region 110. The transport system 120 may include guide elements 130, one or more belts 132, and motors (not shown) that are used to advance the sample racks 200 along the travel path P. As best shown in FIG. 2B, guide elements 130 may comprise movable tabs that travel along the path P and can push the sample racks 200 along the travel path P into the desired position. The transport system 120 may be electronically coupled to a control system 300 (See FIG. 4) that will be described further below.

Referring back to FIGS. 2A-3C, the rack handler 100 includes a rotation assembly 150 that is used to change the orientation of the sample rack 200 along the travel path P. The rotation assembly 150 includes an engagement element 160 that extends along a vertical axis 4. The engagement element 160 has a base 162 and a protrusion 164 that projects upward from the base 162. The protrusion 164 can engage the sample rack as discussed further below. The rotation assembly 150 also includes a motor 330 coupled to the engagement element 160 and operable to cause the engagement element 160 to rotate about the vertical axis 4. Rotation of the engagement element 160 about the vertical axis 4 causes the sample rack to rotate about the vertical axis V when the engagement element 160 is engaged with the sample rack 200.

Figure 3A:
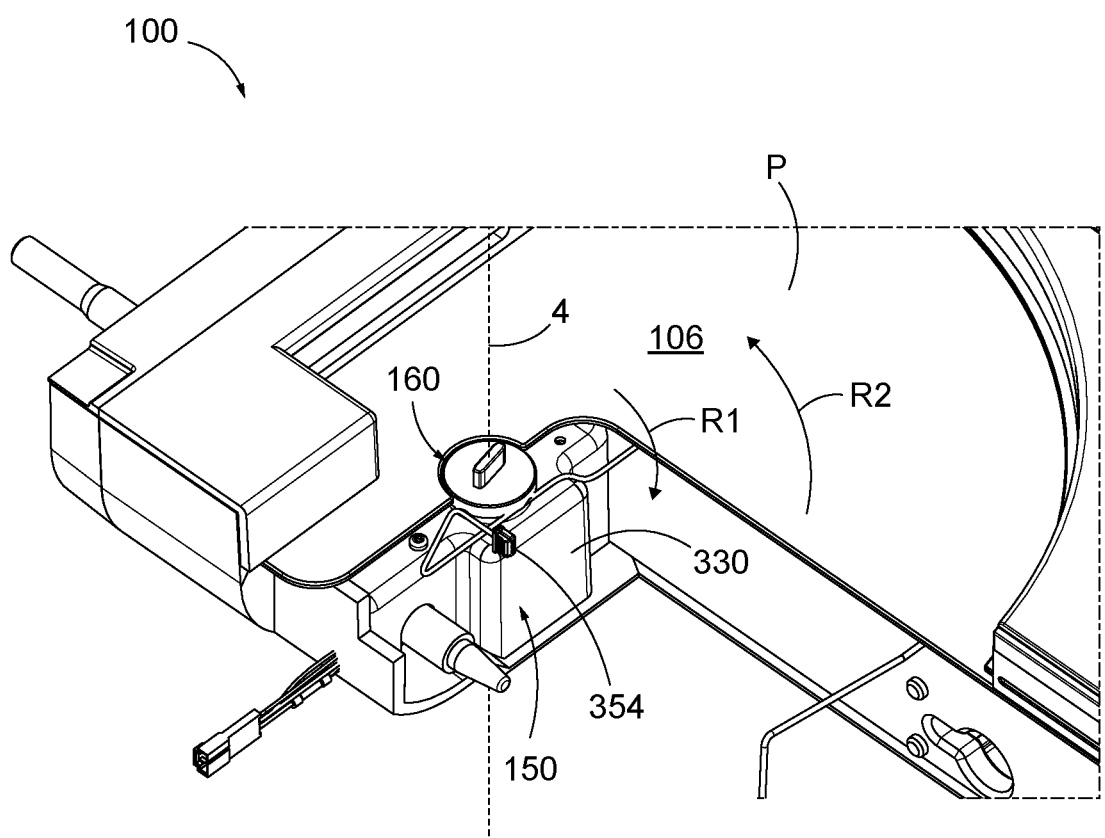
FIG. 3A is a top perspective view of a portion of the rack handler shown in FIG. 2A.
Figure 3B:
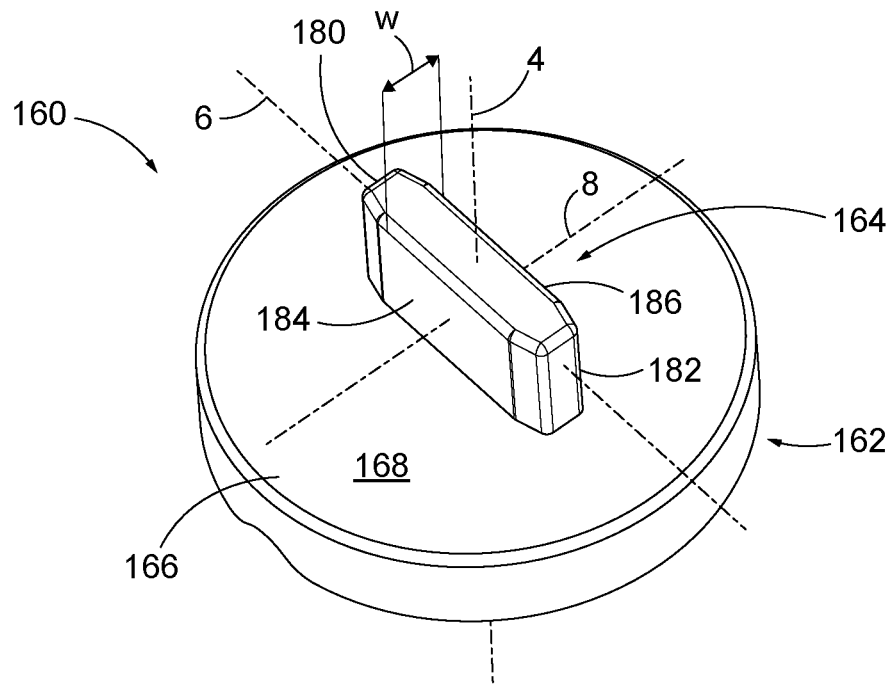
FIG. 3B is a top perspective view of a portion of a rotation assembly shown in FIG. 3A.
Figure 3C:
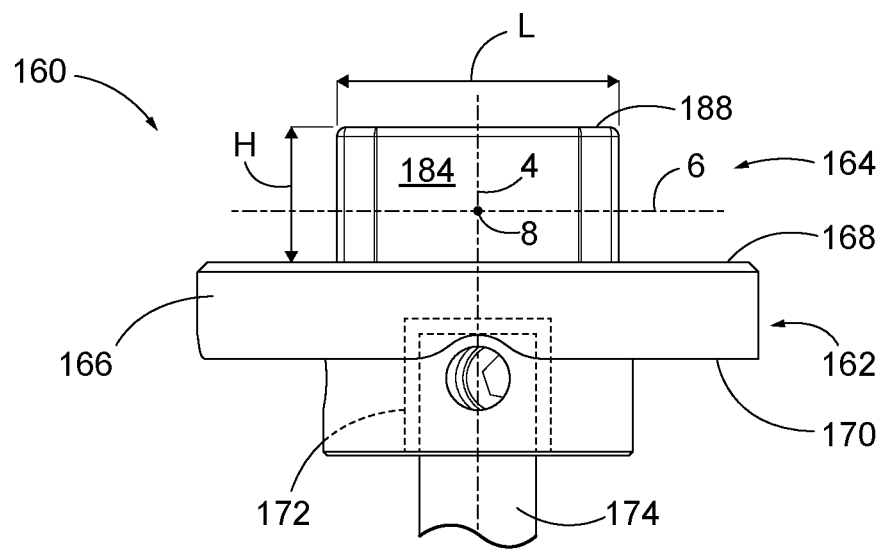
FIG. 3C is a side view the portion of a rotation assembly shown in FIG. 3B.

FIGS. 3A-3C illustrate an exemplary engagement element 160. The engagement element 160 may be any structure or device that can selectively engage and/or be coupled to a sample rack 200. In the embodiment illustrated, the engagement element includes the base 162, which forms a body 166 having an upper surface 168, a lower surface 170 opposite the upper surface 168 along the vertical axis 4, and a central recess 172 that extends from the lower surface 170 into the base 162 along the vertical axis 4. A shaft 174 extends from the motor 330 and into the central recess 172 of the engagement element 160 to rotationally couple the engagement element 160 to the motor 330. The motor 330 may be electrically coupled to a controller 310 in the control system 300 as further explained below and illustrated in FIG. 4. The base 162 is a structure that supports the protrusion 164 and provides enables coupling the motor 330 to the engagement element 160 via the shaft 174. Any particular structure may be used to form the base 162. The base 162 and protrusion 164 may be monolithic. Alternatively, the base 162 and the protrusion 164 may be separate components that are coupled together during manufacture of the rotation assembly 150.

Continuing with FIGS. 3B and 3C, the protrusion 164 may be designed to engage with sample rack 200. As shown, the protrusion projects 164 from the base along the vertical axis 4 and may define an elongated tab that is sized to fit within the slot 270 (FIG. 8) of the sample rack. The protrusion 164 defines a first end 180 and a second end 182 that is opposite the first end 180 along a first axis 6 that is perpendicular to the vertical axis 4. The protrusion 164 also includes a first side 184 that extends between the first and second ends 180, 182, and a second side 186 that extends between the first and second ends 180, 182. The first and second sides 184 and 186 are shown disposed on opposite sides of the vertical axis 4. The protrusion 164 defines a length L that extends from the first end 180 to the second end 182 along a first axis 6 that intersects and is perpendicular to the vertical axis 4, and a width W that extends from the first side 184 to the second side 164 along a second axis 8 that intersects and is perpendicular to the first axis 6 and the vertical axis 4. In the embodiment shown, the length L of the protrusion 164 is greater than the width W of the protrusion 164. The protrusion 164 also includes a top surface 188 and a height H that extends from an upper surface 168 of the base 162 to the top surface 188 along the vertical axis 4. In one example, the height H is less than the length L.

The engagement element 160 may comprise a protrusion 164 with a configuration other than what is illustrated and described above. In alternative embodiments, for example, the protrusion 164 may have any polygonal cross-sectional shape that is defined perpendicular the vertical axis 4. For example, the protrusion can have cross-sectional shape that is a square, a triangle, a pentagon, a hexagon, an octagon, or other shapes that have three or more sides. In another alternative embodiment, the engagement element 160 may comprise a plurality of protrusions (not shown) that are spaced apart and aligned with each other along an axis that intersects and is perpendicular to the vertical axis 4. For instance, the engagement element 160 may include a first protrusion and a second protrusion that is spaced apart from and aligned with the first protrusion along the axis. In such an embodiment, the first and second protrusions are positioned to engage the slot of the sample rack.

The rotation assembly 150 is operable to cause the engagement element 160 to rotate about the vertical axis 4 to cause the sample rack 200 to pivot. In the embodiment shown, the engagement element 160 is rotatable in a first rotational direction R1 and a second rotational direction R2 that is opposite the first rotational direction R1. The rotational direction of the engagement element 160 is based, in part, on its engagement with the sample rack 200 and the orientation of the sample rack 200. How the rotation assembly 150 operates to pivot the sample rack from the first orientation to a second orientation is described in further detail below.

Figure 4:
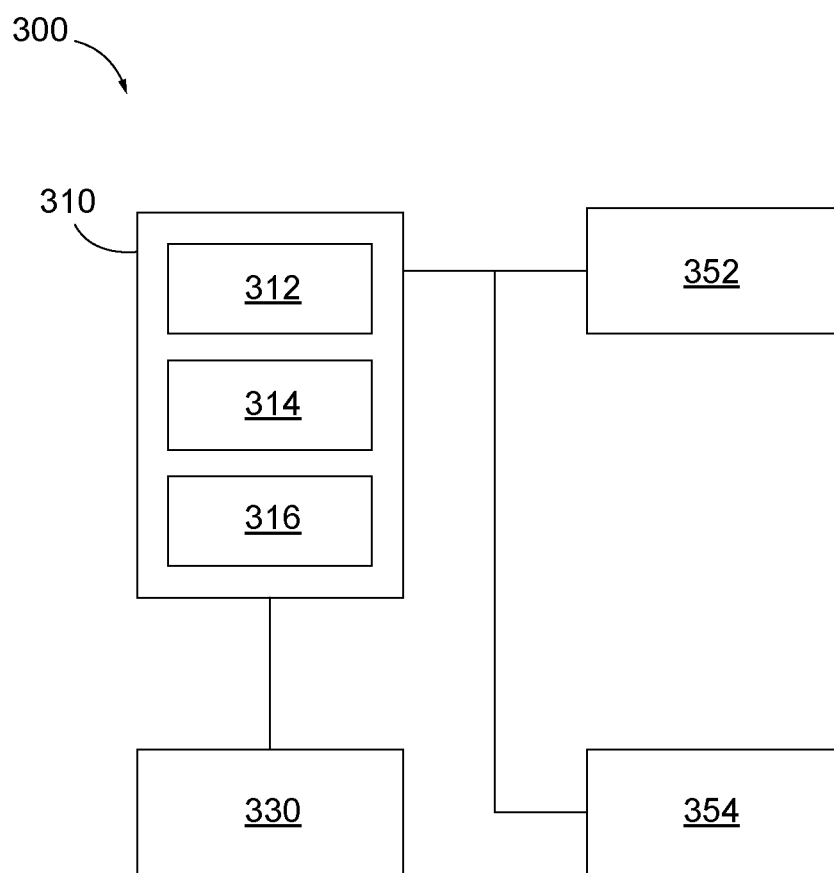
FIG. 4 is a schematic diagram illustrating a control system used in the rack handler shown in FIG. 2A.
Figure 5:
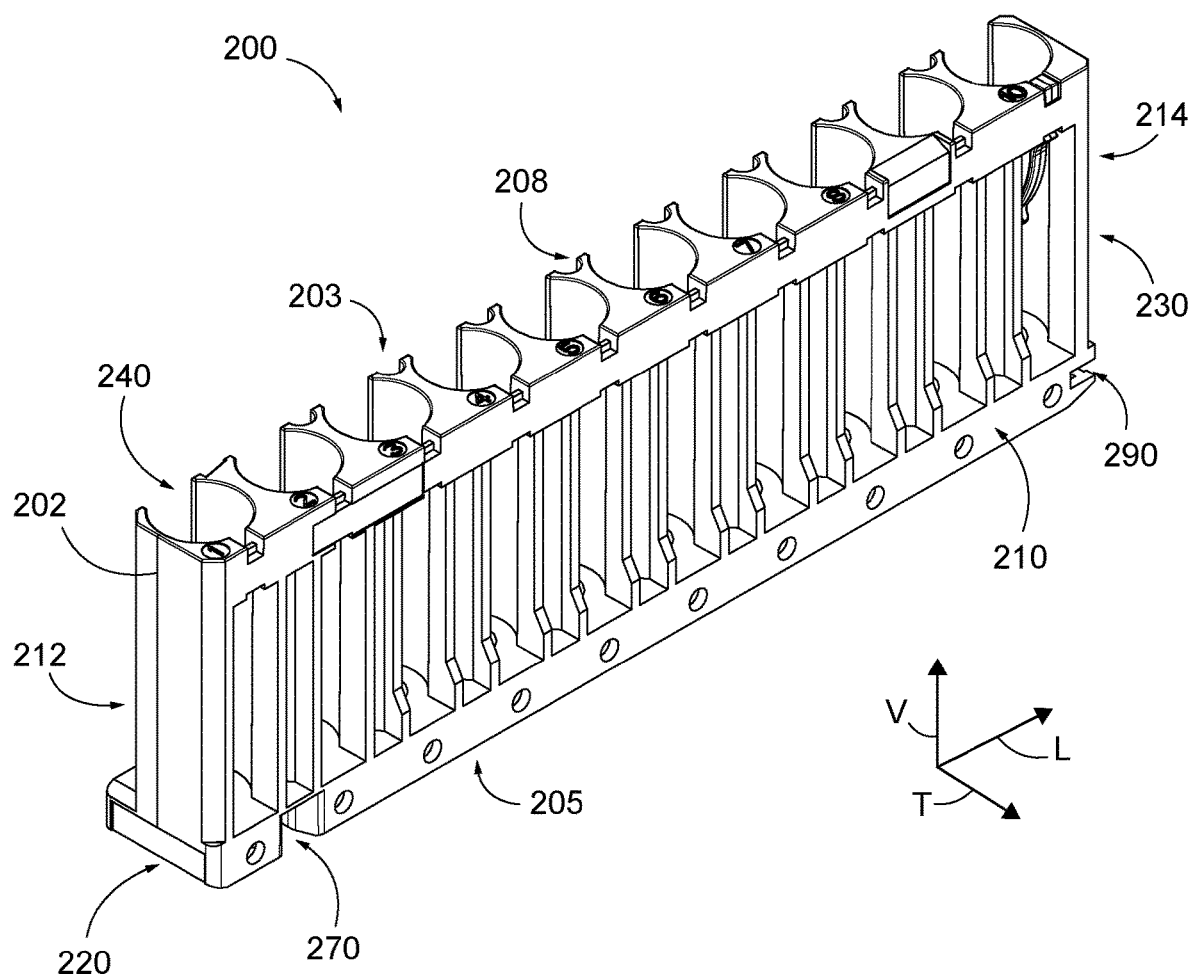
FIG. 5 is a perspective view of the sample rack used in the system illustrated in FIG. 1.
Figure 6:
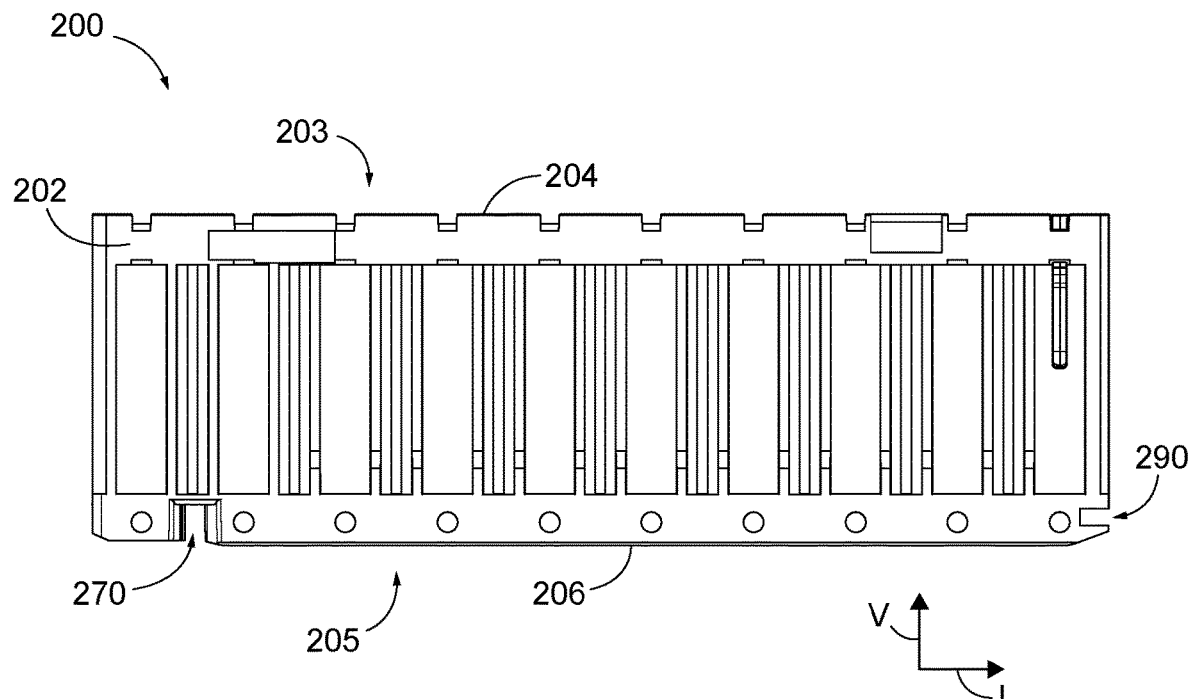
FIG. 6 is a rear elevation view of the sample rack illustrated in FIG. 5.

FIG. 4 illustrates a control system 300 used to control operation of at least the rack handler 100. The control system 300 includes one or more controllers 310, at least one motor 330 that is electrically coupled to the controller 310, and a plurality of sensors electrically coupled to the controller 310. The controller 310 includes at least one processing unit 312, a memory unit 314, and communications unit 316. The sensors are positioned along various portions of the travel path P and may be configured to detect the presence of a sample rack 200 proximate to a particular sensor. In the embodiment illustrated, the control system includes a first sensor 352, a second sensor 354 and optionally one or more additional sensors. The sensors 352 and 354 obtain sensor data concerning a position of the sample rack that is transmitted electronically to the controller 310 through the communications unit 314. In this regard, the sensors 352 and 354 are position sensors, such as Hall Effect sensors. However, other sensors could be used to determine rack 200 position. The controller 310, in turn, causes the motor 330 to operate based on the position data of the sample rack 200 obtained via the sensors described above. Operation of the rack handler 100 to move the sample racks 200 along the travel path P will be described further below.

FIGS. 5-9 illustrate a sample rack 200 adapted to engage the rack handler 100. The sample rack 200 includes a rack body 202, a bottom 205, and a top 203 spaced from the bottom 205 along a vertical direction V. The rack body 202 further defines a top surface 204 at the top 203 and a bottom surface 206 at the bottom 205 that opposite the top surface 204 along the vertical direction V. The rack body 202 further includes a first side 208, a second side 210 opposite the first side 208 along a transverse direction T, a first end 212, and a second end 214 opposite the first end 212 along a longitudinal direction L. In the drawings, the longitudinal direction L is perpendicular to the vertical direction V and to the transverse direction T. As illustrated, the rack body 202 further includes a base portion 220 that defines the bottom surface 206, and a rack portion 230 that extends upwardly from the base portion 220 along the vertical direction V. The rack portion 230 defines the top surface 204. The rack body 202 includes at least one receptacle 240 (such as a plurality of receptacles). The receptacle 240 is sized and shaped to hold a sample collection unit 50. In accordance with the illustrated embodiment, the rack 200 includes 10 separate receptacles 240. However, the rack 200 may include less than ten receptacles, such as one receptacle 240, or more than ten receptacles 240.

As best shown in FIGS. 5-9, the rack 200 is configured to engage a portion of the rack handler 100, such as, for example, the rotation assembly 150. The rack body 202 includes a first interior surface 250 that extends from the bottom 205 toward the top 203 along the vertical direction, and a second interior surface 260 that extends from the bottom 205 toward the top 203 along the vertical direction V. The first interior surface 250 and the second interior surface 260 may be referred to as first wall 250 and a second wall 260, respectively. The second interior surface 260 is opposite to the first interior surface 250 so as to at least partially define a slot 270 along the bottom 205 of the sample rack 200. Furthermore, the sample rack 200 includes at least one interference groove 252, 262 in either of both of the first interior surface 250 and the second interior surface 260. For instance, as illustrated, the sample rack 200 includes a first interference groove 252 formed in the first interior surface 250 and a second interference groove 262 formed in the second interior surface 260. In other embodiments, the rack may include a single interference groove.

As illustrated, the rack 200 includes a single slot 270 along the bottom 205 of the sample rack 200. However, in alternative embodiments, the rack may include a plurality of slots along the bottom 205 for receiving the a portion of the rack handler 100. For example, the rack 200 may have a first slot 270 and a second slot (not shown) that is similar to the first slot. Multiple slots would allow the rack 200 to be inserted into the rack handler in either orientation and still be rotatable by the rotation assembly 150.

Figure 7:
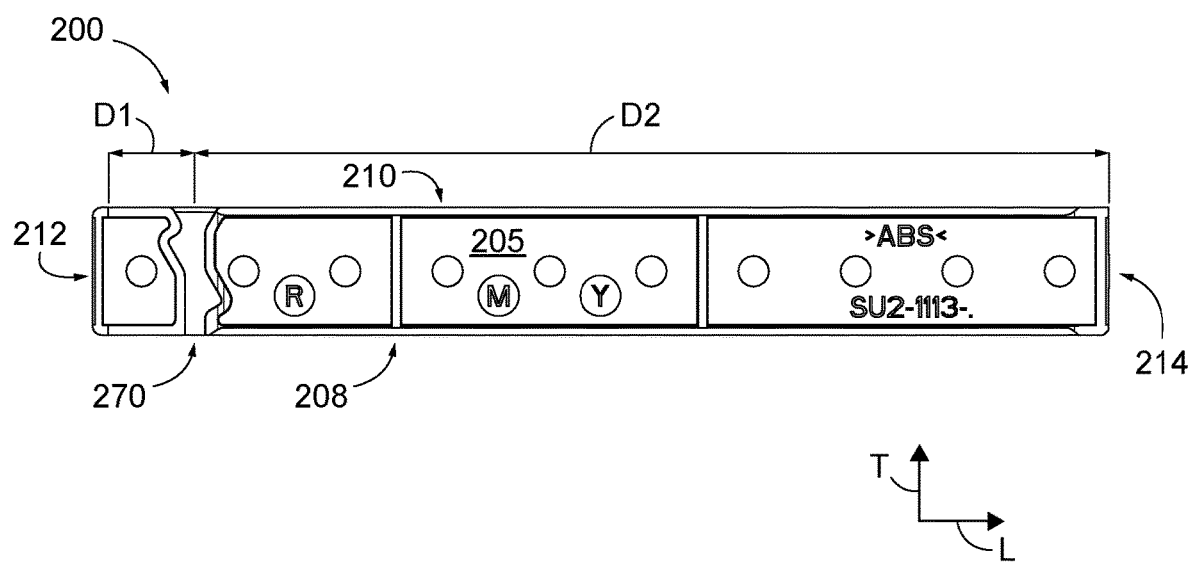
FIG. 7 is a bottom plan view of the sample rack illustrated in FIG. 5.
Figure 8:
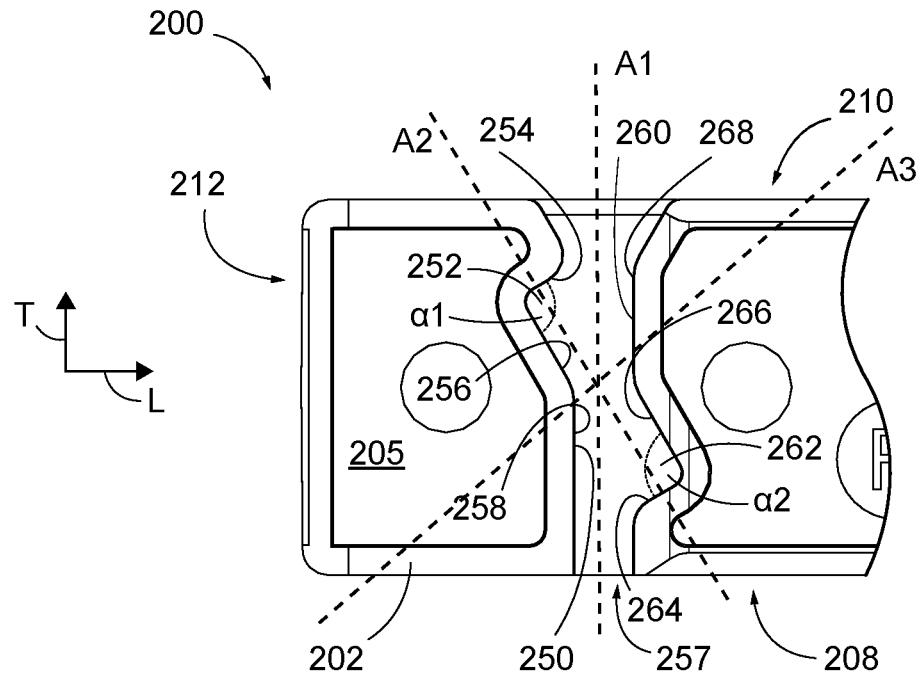
FIG. 8 is a detailed view of a portion of the bottom of the sample rack illustrated in FIG. 5.
Figure 9:
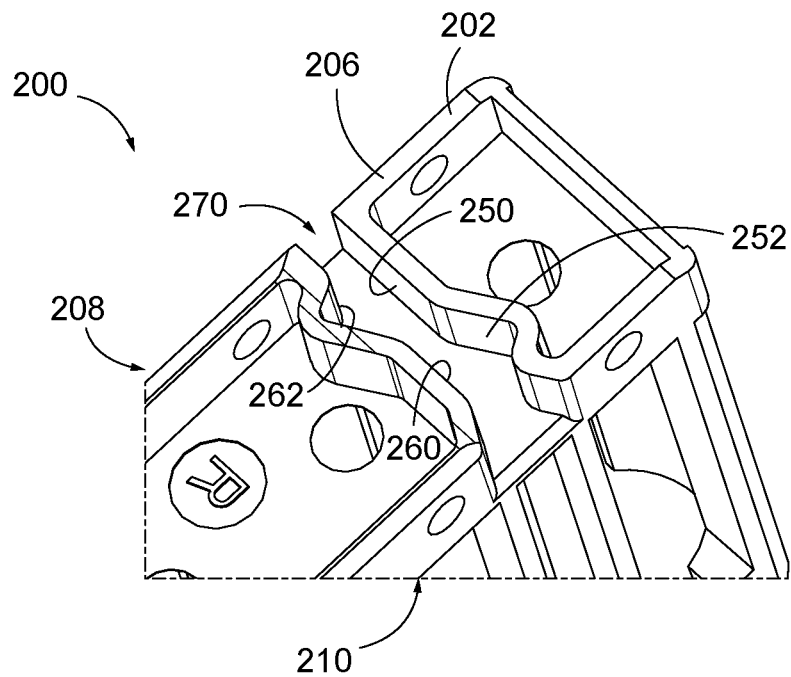
FIG. 9 is a detailed perspective view of a portion of the bottom of the sample rack illustrated in FIG. 5.

Referring to FIGS. 7-9, the first interior surface 250 has a first portion 254, a second portion 256, and a third portion 258. The first portion 254 and second portion 256 are angularly offset with respect to each other so as to define the first interference groove 252. In particular, the first portion 254 and the second portion 256 may intersect to define a first angle α1 therebetween. In the illustrated embodiment, the first angle α1 is less than 180 degrees. In one example, the first angle α1 is between 45 degrees and 135 degrees. The first angle α1 may not be limited to this stated range. However, in alternative embodiments, the first and second portions 254 and 256 may not intersect. In other alternative embodiments, the first and second portions 254 and 256 may not intersect and may be substantially parallel to each other to define the interference groove. Furthermore, as shown in the figures the third portion 258 is angularly offset from the first and second portions 254 and 256.

Referring to FIGS. 7-9, the second interior surface 260 includes a first portion 264, a second portion 266, and a third portion 268. The first portion 264 and a second portion 266 are angularly offset with respect to each other so as to define the second interference groove 262. The first portion 264 and the second portion 266 may intersect to define a second angle α2 therebetween. In the illustrated embodiment, the first angle α2 is less than 180 degrees. In one example, the second angle α2 is between 45 degrees and 135 degrees. The second angle α2 may not be limited to this stated range. However, in alternative embodiments, the first and second portions 264 and 266 may not intersect. In other alternative embodiments, the first and second portions 264 and 266 may not intersect and may be substantially parallel to each other to define the interference groove. As illustrated, the third portion 268 is angularly offset from the first and second portions 264 and 266. In addition, the third portion 258 of the first interior surface 250 is substantially parallel to the third portion 268 of the second interior surface 260. In alternative embodiments, the third portion 258 of the first interior surface 250 may not be specifically parallel to the third portion 268 of the second interior surface 260.

Furthermore, and continuing with FIGS. 7-9, the slot 270 includes a first wall 250 and a second wall 260 that is substantially a parallel to the first wall 250. As illustrated, the first and second walls 250, 260 are arranged on opposing sides of a first axis A1. The first axis A1 can be described as the center line of the slot. The first wall 250 has at least one indentation 252 and the second wall 260 has at least one indentation 262. The indentation 252 in the first wall 250 has first and second portions 254 and 256. The indentation 262 in the second wall 260 has first and second portions 264 and 266. The respective first portions 254, 264 of each indentation 252, 262 can be oriented along a second axis A2 which is offset from the first axis A1. The respective second portions 256, 266 of each indentation 254, 264 can be oriented along a third axis A3 which is offset from the first axis A1 and second axis A2. Furthermore, the distance between the second portions 256, 266 of the indentations 252, 262 generally corresponds to the size of the engagement element 160.

As illustrated in FIGS. 7-9, the slot 270 extends from the first side 208 to the second side 210 and is located primarily in the base portion 220 of the sample rack 200. In addition, the slot 270 is closer to the first end 212 than to the second end 214. In other words, the slot 270 may be spaced a first distance D1 from the first end 212 and a second distance D2 from the second end 214 but the first distance D1 is less than the second distance D2. The location of the slot 270 toward the first end 212 can facilitate engagement with the rack handler 100 and rotation by the rack handler 100 as shown and further described below.

Continuing with FIGS. 7-9, one end of the slot 270 may be widened in order to allow for easy insertion of the engagement element 160 when the sample rack is not perfectly aligned with the rotation assembly 150. In alternative embodiment, both ends of the slot 270 could be widened as well.

Referring back to FIGS. 5 and 6, the sample rack 200 includes a recess 290 that is adapted to engage the transport system 120 of the rack handler 100. As shown, the rack body 202 defines a recess 290 that extends into the second end 214 of the rack body 202 along the longitudinal direction L. Furthermore, the recess 290 extends from the first side 208 to the second side 210. The recess 290 is shown spaced slightly above the bottom surface 206 along the vertical direction V in order to engage a guide element 130. The recess 290 engages a guide element along a substantially portion of the travel path P through the rack handler 100 and helps to stabilize the rack 200 during transport along the travel path P.

Figure 10:
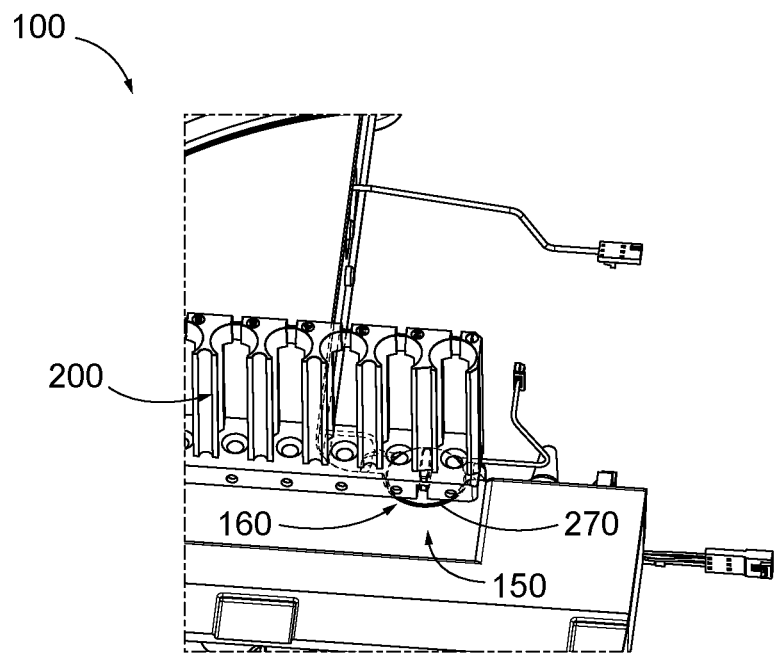
FIG. 10 is a perspective view of a portion of the rack handler in FIG. 2A, illustrating the sample rack engaged with a rotation assembly in a first configuration.
Figure 11:
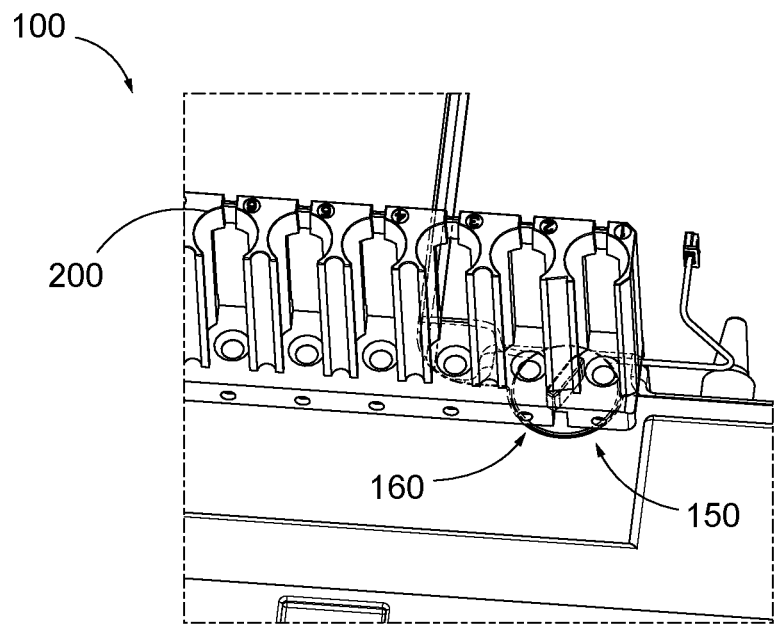
FIG. 11 is a perspective view of a portion of the rack handler in FIG. 2A, illustrating the sample rack engaged with a rotation assembly in a second, engaged configuration.
Figure 12:
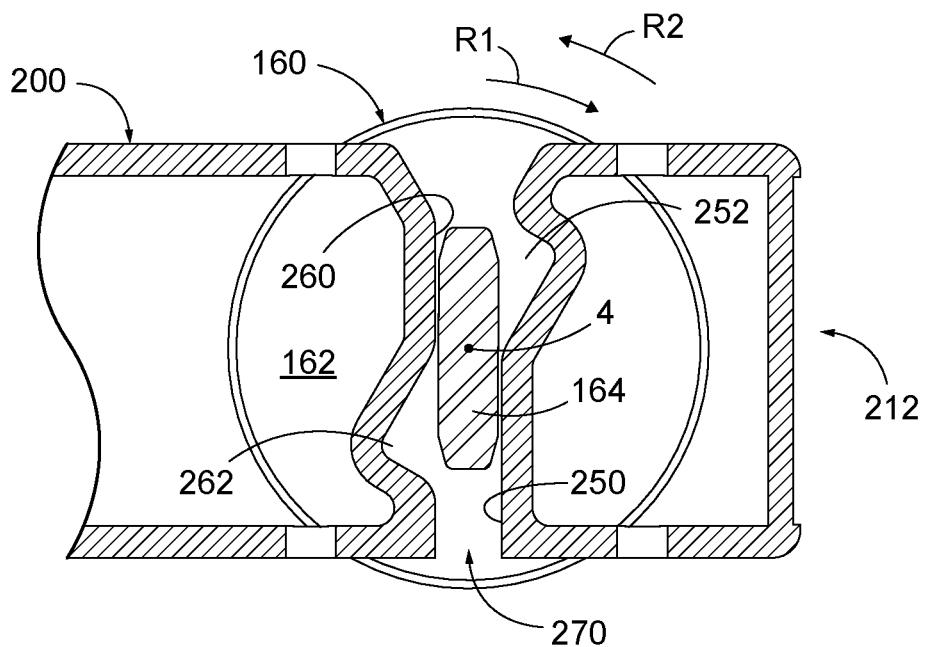
FIG. 12 is a cross-sectional view of a portion of the rack handler taken along line A-A in FIG. 10, illustrating the sample rack engaged with the rotation assembly in the first configuration.

Turning to FIGS. 10-13, the engagement element 160 is designed to engage with a portion of the sample rack 200 to move the sample rack 200 from a first orientation where the side 210 faces the test device 20 into a second orientation that is rotationally different than the first orientation. As shown in FIGS. 10 and 12, the sample rack 200 may be moved over the rotation assembly 150 so that the protrusion 164 slides within the slot 270. In this configuration, the sides of the protrusion 164 are generally parallel to the first and second interior surfaces 250 and 260 of the sample rack 200.

Figure 13:
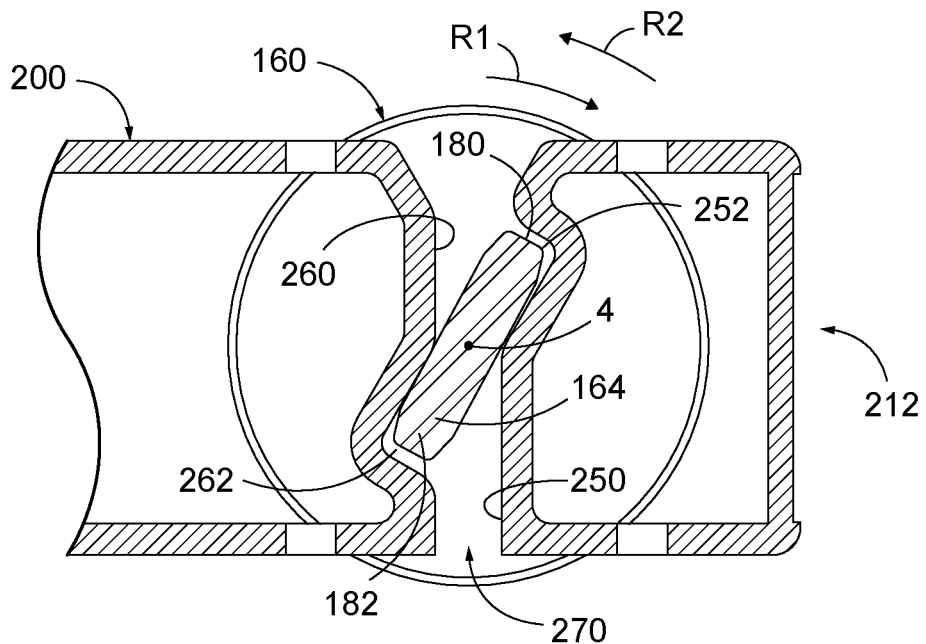
FIG. 13 is a sectional view of a portion of the rack handler taken along line B-B in FIG. 11, illustrating the sample rack engaged with a rotation assembly in the second, engaged configuration.
Figure 14:
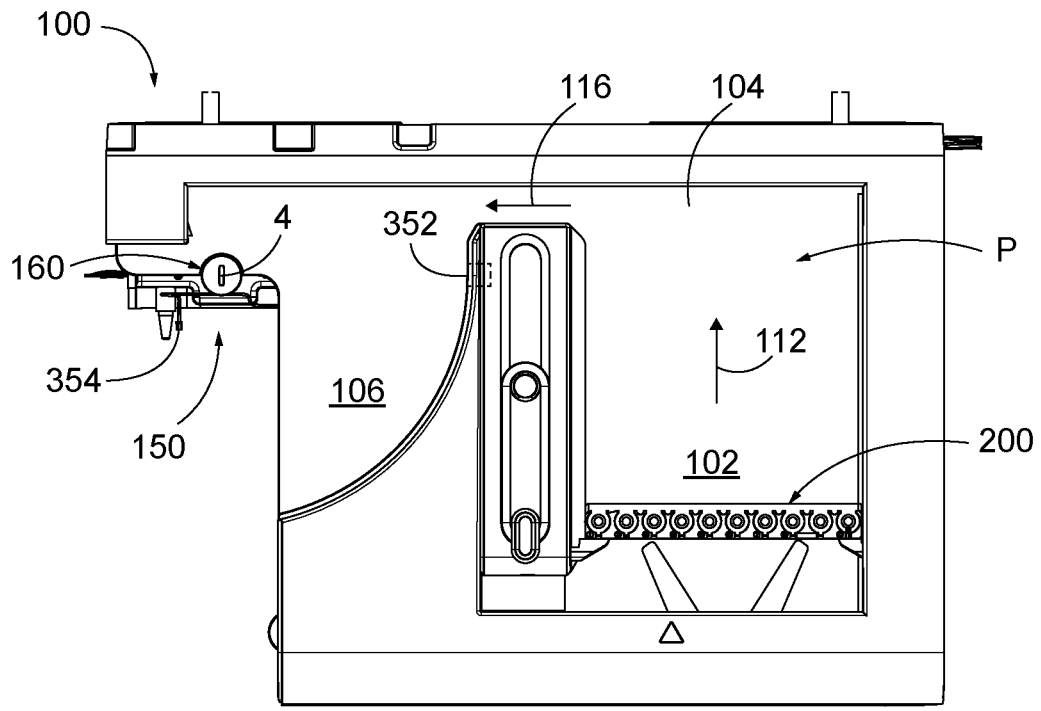
FIG. 14 is a plan view of the rack handler with a sample rack shown in an input staging region.
Figure 15:
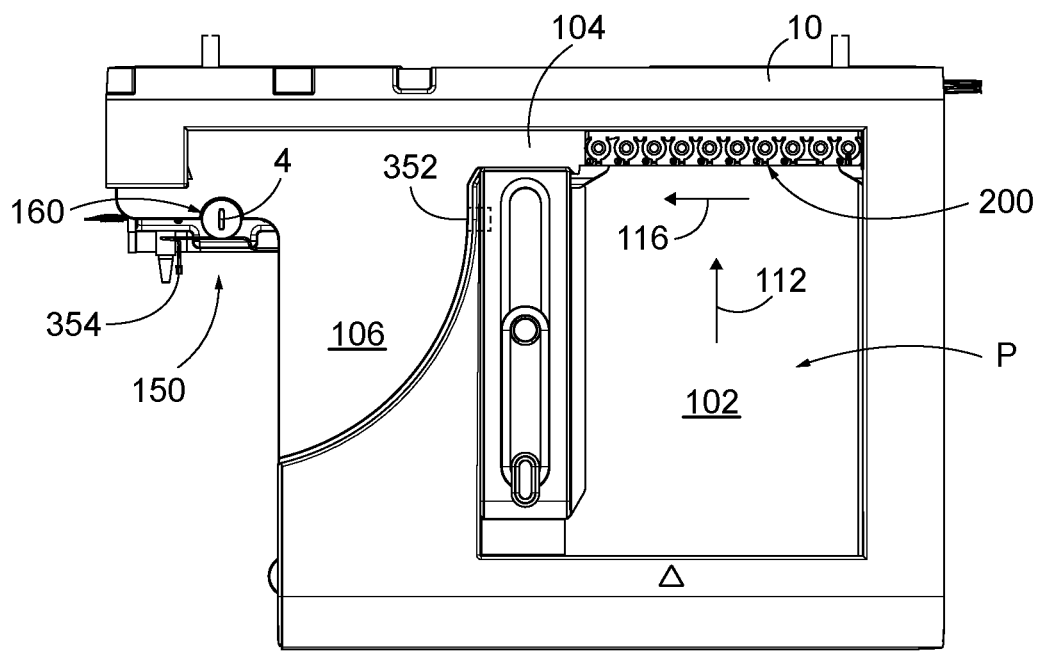
FIG. 15 is a plan view of the rack handler with the sample rack shown adjacent to test device prior to the sample rack being staged in a testing position.

As shown in FIGS. 11 and 13, the controller 310 can cause the engagement element 160 to rotate in the slot 270 of the sample rack 200 a first rotational distance R1 to engage the at least one interference groove 252, 262 in the sample rack 200. In particular, the first and second ends 180 and 182 of the protrusion 164 can engage with and abut the first and second interference grooves 252 and 262, respectively. When the protrusion 164 is engaged with the interference groove 252, 262, the engagement element rotates a second rotational distance R2 (not shown) to rotate the sample rack 200 from the first orientation (e.g. see FIG. 17) into the second orientation (e.g. FIG. 19). Thus, it can be seen that the engagement element 160 rotates a first rotational distance to fully engage the sample rack 200 and rotates a second rotational distance to cause the sample rack 200 to rotate into the second orientation. In this manner, the second rotational distance is greater than the first rotation distance. When the sample rack is in the second orientation, the engagement element 160 can disengage from the sample rack 200. In particular, the engagement element 160 can rotate in a second rotational direction R2 that is opposite to the first rotational direction R1 in order move the protrusion 164 out of engagement with the interference groove 252, 262. When the protrusion 164 is aligned with the slot 270, similar to that which is shown in FIG. 12, the sample rack 200 can be translated along the travel path P by the transport system 120.

Figure 16:
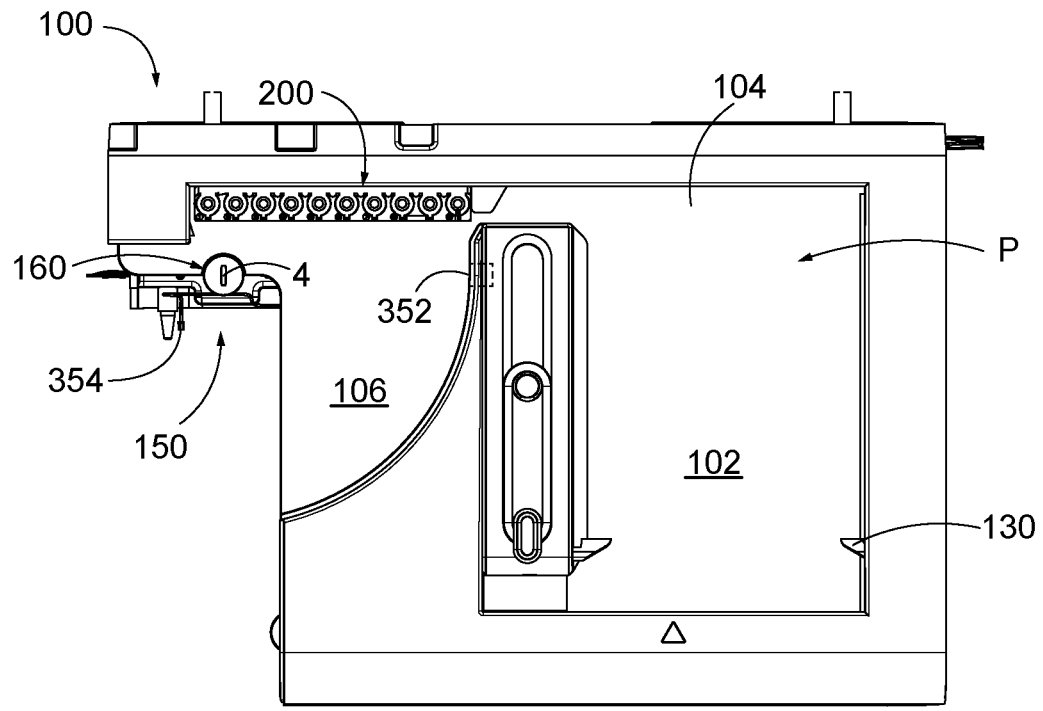
FIG. 16 is a plan view of the rack handler with the sample rack shown adjacent to test device after the sample rack is moved out of the testing position.

As illustrated in FIGS. 14-20, the transport system 120 advances the sample rack 200 from the input staging region 102 in a first direction 112 to the first test device 10 until the sample rack 200 is positioned in the lateral portion 104. The transport system 120 can advance the sample rack 200 in a lateral direction 116 into a testing position proximate an analyzer (not shown) in the test device 10. Once testing is complete, the transport system 120 advances the sample rack 200 further along the lateral portion 104 until the sample rack is aligned with the rotation region 106, as shown in FIG. 16.

Continuing with FIGS. 14-20, the transport system 120, via a controller 310, advances the sample rack 200 over the engagement element 160. As discussed above, the first sensor 352 determines when the sample rack 200 is engaged with the engagement element 160 of the rack handler in the first orientation (similar to the position shown in FIGS. 10, 12, & 17). The controller 310 causes the motor 330 to begin rotation of the engagement element 160. The engagement element 160 then rotates into engagement with the interference groove 252, 262 of the slot 270, as described above (and shown in FIGS. 11 and 13).

Figure 17:
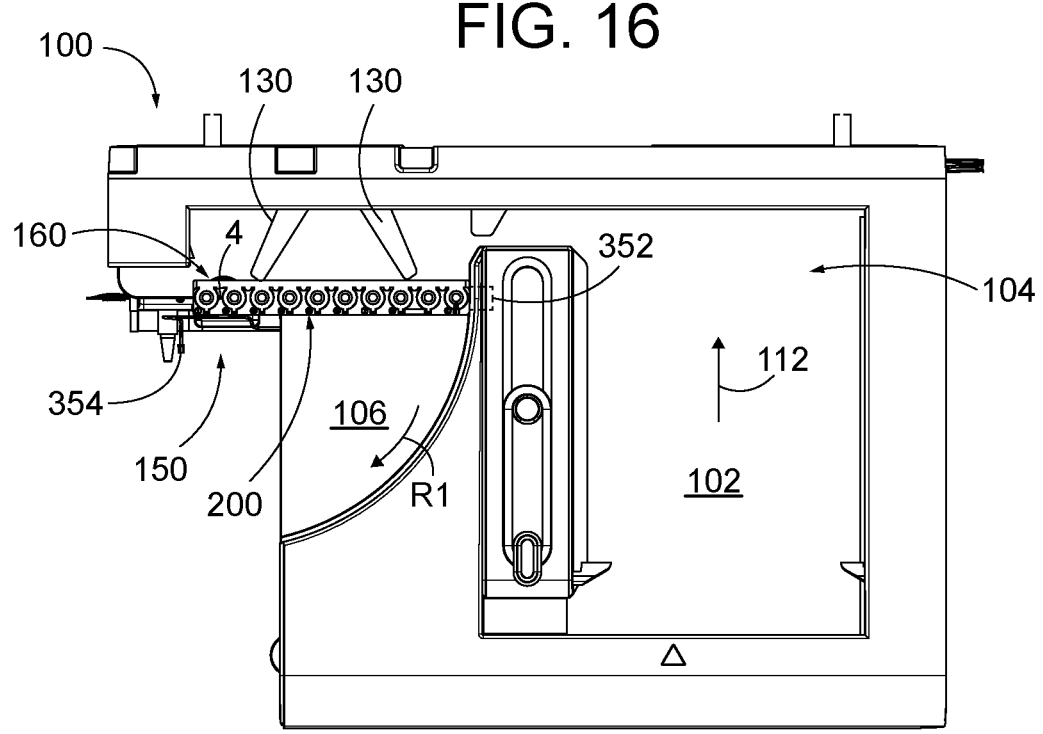
FIG. 17 is a plan view of the rack handler with the sample rack shown advanced into engagement with the rotation assembly and in the first orientation.
Figure 18:
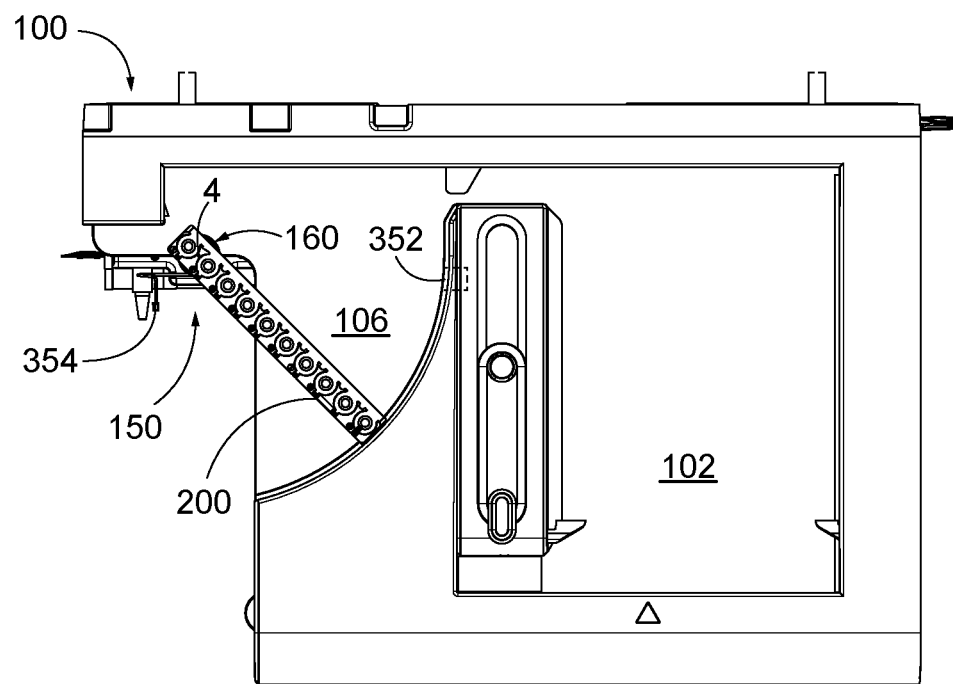
FIG. 18 is a plan view of the rack handler showing the sample rack rotated into a different orientation.
Figure 19:
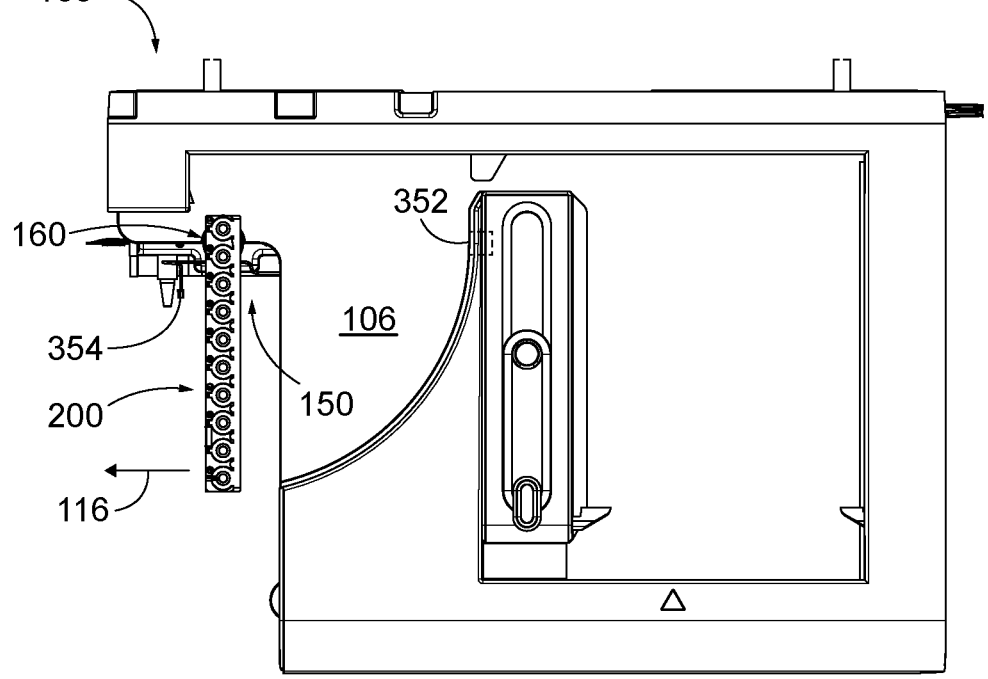
FIG. 19 is a plan view of the rack handler with the sample rack shown in a completed turn and engaged with the rotation assembly and in a second orientation.
Figure 20:
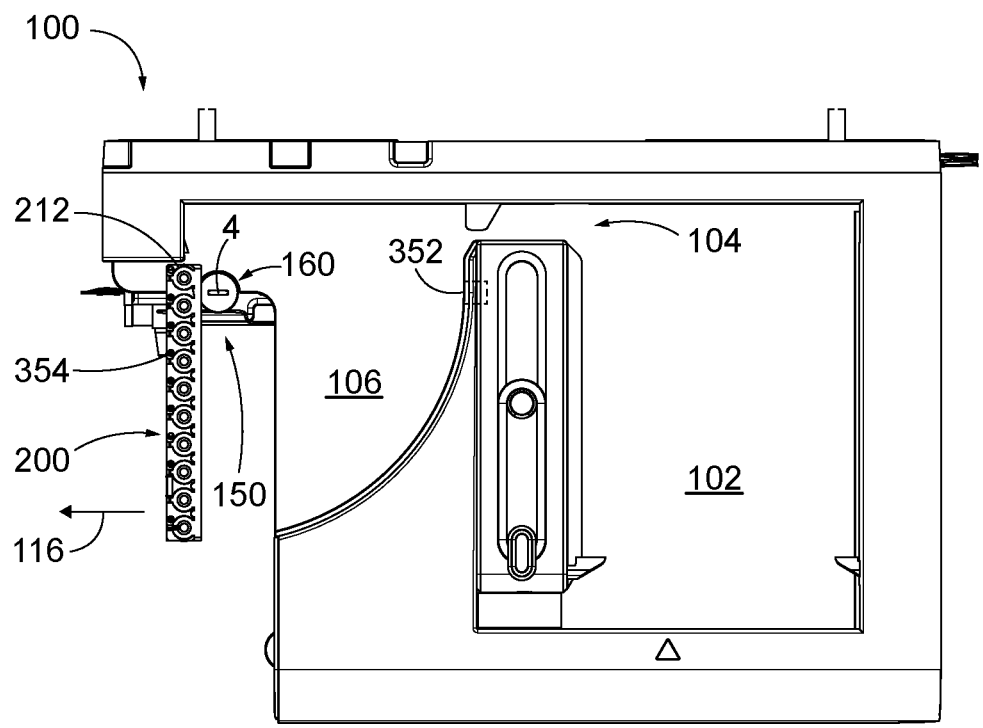
FIG. 20 is a plan view of the rack handler with the sample rack shown advanced off of the rotation assembly and positioned for transport to another test device.

Referring to FIGS. 18-20, continued rotation of the engagement element 160 while the engagement element 160 is engaged with the groove 252, 262 causes the sample rack 200 to rotate about a vertical axis 4 of the rack handler 100 into second orientation, as shown in the progression of FIGS. 17, 18 and 19. The second sensor 354 determines when the sample rack 200 is in the second orientation and is still engaged with the engagement element 160 (i.e., the protrusion is engaged with the grooves 252, 262). The controller 310 reverses rotation of the engagement element 160 so that the engagement element 160 is aligned with slot 270. The second sensor 354 that determines when the sample rack is in the second orientation and is disengaged from the engagement element, i.e. the protrusion in disengaged with the grooves 252, 262 as shown in FIGS. 11 and 13, and rack 200 is not over the rotation assembly 150.

Referring to FIGS. 19 and 20, the controller 310 can then cause the transport system 120 to advance the sample rack 200 along a direction 116 until the sample rack 200 has disengaged from the engagement element 160 completely. If the sample rack 200 is disengaged, the transport system 120 may be used to advance the sample rack along the direction 115 in travel region 108.

In the second orientation as shown in FIG. 20, the longitudinal end 212 of the sample rack may face the first test device 10 (or second test device if present). In this manner, the sample rack 200 is oriented to be inserted into the portal 26 of the second test device 20. The transport system 120 translates the sample rack 200 in the second direction 116. Once the sample rack 200 is positioned adjacent to portal 26, guide elements (not shown) pull the sample rack 200 along the first direction 112 into the housing 22 of the second test device 20 so that the sample(s) can be further analyzed, as shown in FIG. 1. When testing is complete, the sample rack 200 is pushed out onto the travel path P. The transport system 120 advances the sample rack 200 into the output staging region 110.

The invention includes the following illustrative embodiments:

Embodiment 1 is a rack adapted to engage a rack handler and to carry a sample collection unit. The rack includes rack body. The rack body includes a bottom, a top opposite the bottom along a vertical direction, and a receptacle that extends from the top toward the bottom along the vertical direction, the receptacle sized to receive the sample collection unit. The rack body also includes a first interior surface that extends from the bottom toward the top along the vertical direction, and a second interior surface that extends from the bottom toward the top along the vertical direction, the second interior surface being opposite to the first interior surface so as to at least partially define a slot along the bottom. The rack body also includes an interference groove in the slot along at least one of the first interior surface and the second interior surface. The slot and the interference groove are sized to engage a portion of the rack handler.

Embodiment 2 is the rack of embodiment 1, wherein the first interior surface has a first portion and a second portion that is angularly offset with respect to the first portion so as to define the interference groove that engages a portion of a rack handler.

Embodiment 3 is the rack of embodiment 1, wherein the first and second portions of the first interior surface intersect to define a first angle, wherein the first angle is less than 180 degrees.

Embodiment 4 is the rack of embodiment 1, wherein the interference groove is a first interference groove, wherein the second interior surface has a first portion and a second portion that is angularly offset with respect to the first portion of the second interior surface so as to define a second interference groove that engages the portion of a rack handler.

Embodiment 5 is the rack of embodiment 1, wherein the first and second portions of the second interior surface intersect to define a first angle, wherein the first angle is less than 180 degrees.

Embodiment 6 is the rack of embodiment 1, wherein the first interior surface defines a third portion that is angularly offset from the first and second portions of the first interior surface. The second interior surface defines a third portion that is angularly offset from the first and second portions of the second interior surface and the third portion of the first interior surface is substantially parallel to the third portion of the second interior surface.

Embodiment 7 is the rack of embodiment 1, further comprising a first side and a second side opposite the first side along a transverse direction that is perpendicular to the vertical direction, wherein the slot extends from the first side to the second side.

Embodiment 8 is the rack of embodiment 1, further comprising a first end and a second end opposite the first end along a longitudinal direction that is perpendicular to the vertical direction, wherein the slot is closer to the first end than to the second end.

Embodiment 9 is the rack of embodiment 8, further comprising a recess that extends into one of the first end or the second end along the longitudinal direction.

Embodiment 10 is the rack of embodiment 1, wherein the slot and the interference groove are disposed entirely below the receptacles along the vertical direction.

Embodiment 11 is the rack of embodiment 1, wherein the receptacle is a plurality of receptacles for receiving a plurality of the sample collection units.

Embodiment 12 is a sample analysis system for analyzing a sample. The system includes a rack handler and a rack having a rack body. The rack body has a bottom surface, a top opposite the bottom along a vertical direction, and a receptacle that extends from the top toward the bottom along the vertical direction, the receptacle sized to receive the sample collection unit. The rack body has a first interior surface that extends from the bottom toward the top along the vertical direction and a second interior surface that extends from the bottom toward the top along the vertical direction, the second interior surface being opposite to the first interior surface so as to at least partially define a slot along the bottom. The rack body has an interference groove along at least one of the first interior surface and the second interior surface, wherein the slot and the interference groove are sized to engage a portion of the rack handler.

Embodiment 13 is the system of embodiment 12, wherein the at least one sample collection unit is a plurality of sample collection units, wherein the at least one receptacle is a plurality of receptacles.

Embodiment 14 is the system of embodiment 12, wherein the first interior surface has a first portion and a second portion that is angularly offset with respect to the first portion so as to define the interference groove that engages a portion of a rack handler.

Embodiment 15 is the system of embodiment 12, wherein the first and second portions of the first interior surface intersect to define a first angle, wherein the first angle is less than 180 degrees.

Embodiment 16 is the system of embodiment 12, wherein the interference groove is a first interference groove, wherein the second interior surface has a first portion and a second portion that is angularly offset with respect to the first portion of the second interior surface so as to define a second interference groove that engages the portion of a rack handler.

Embodiment 17 is the system of embodiment 12, wherein the first and second portions of the second interior surface intersect to define a first angle, wherein the first angle is less than 180 degrees.

Embodiment 18 is the system of embodiment 12, wherein the first interior surface defines a third portion that is angularly offset from the first and second portions of the first interior surface, and wherein the second interior surface defines a third portion that is angularly offset from the first and second portions of the second interior surface. The third portion of the first interior surface is substantially parallel to the third portion of the second interior surface.

Embodiment 19 is the system of embodiment 12, further comprising a first side and a second side opposite the first side along a transverse direction that is perpendicular to the vertical direction, wherein the slot extends from the first side to the second side.

Embodiment 20 is the system of embodiment 12, further comprising a first end and a second end opposite the first end along a longitudinal direction that is perpendicular to the vertical direction, wherein the slot is closer to the first end than to the second end.

Embodiment 21 is the system of embodiment 21, further comprising a recess that extends into one of the first end or the second end along the longitudinal direction.

Embodiment 22 is the system of embodiment 12, wherein the slot and the interference groove are disposed entirely below the receptacles along the vertical direction.

Embodiment 23 is the system of embodiment 12, wherein the receptacle is a plurality of receptacles for receiving a plurality of the sample collection units.

The invention as described in the present disclosure is capable of exploitation in industry in accordance with how it can be made and/or used.

Those skilled in the art will also appreciate that the present disclosure may be applied to other applications and may be modified without departing from the scope of the present disclosure. Accordingly, the scope of the present disclosure is not intended to be limited to the exemplary embodiments described above, but only by the appended claims.

The invention claimed is:

1. A rack adapted to engage a rack handler and to carry a sample collection unit, the rack comprising:
a rack body having:
 a bottom;
 a top opposite the bottom along a vertical direction;
 a receptacle that extends from the top toward the bottom along the vertical direction, the receptacle sized to receive the sample collection unit;
 a first side;
 a second side opposite the first side along a horizontal direction;
 a first interior surface having a length that extends from the first side to the second side along the horizontal direction and a width that extends from the bottom toward the top along the vertical direction, the length of the first interior surface being greater than the width of the first interior surface; and
 a second interior surface having a length that extends from the first side to the second side along the horizontal direction and a width that extends from the bottom toward the top along the vertical direction, the length of the second interior surface being greater than the width of the second interior surface, the second interior surface being opposite to the first interior surface so as to at least partially define a slot along the bottom,
 wherein at least one of the first interior surface and the second interior surface is non-linear along the length thereof to form an interference groove in the slot, and
 wherein the slot and the interference groove are sized to engage a portion of the rack handler.

2. The rack of claim 1, wherein the first interior surface has a first portion and a second portion that is angularly offset with respect to the first portion so as to define the interference groove that engages a portion of a rack handler.

3. The rack of claim 2, wherein the first and second portions of the first interior surface intersect to define a first angle, wherein the first angle is less than 180 degrees.

4. The rack of claim 2, wherein the interference groove is a first interference groove, wherein the second interior surface has a first portion and a second portion that is angularly offset with respect to the first portion of the second interior surface so as to define a second interference groove that engages the portion of a rack handler.

5. The rack of claim 4, wherein the first and second portions of the second interior surface intersect to define a first angle, wherein the first angle is less than 180 degrees.

6. The rack of claim 4, wherein the first interior surface defines a third portion that is angularly offset from the first and second portions of the first interior surface, wherein the second interior surface defines a third portion that is angularly offset from the first and second portions of the second interior surface, wherein the third portion of the first interior surface is substantially parallel to the third portion of the second interior surface.

7. The rack of claim 1, further comprising a first end and a second end opposite the first end along a longitudinal direction that is perpendicular to the vertical direction, wherein the slot is closer to the first end than to the second end.

8. The rack of claim 7, further comprising a recess that extends into one of the first end or the second end along the longitudinal direction.

9. The rack of claim 1, wherein the slot and the interference groove are disposed entirely below the receptacle along the vertical direction.

10. The rack of claim 1, wherein the receptacle is a plurality of receptacles for receiving a plurality of the sample collection units.

11. A sample analysis system for analyzing a sample, comprising:
a rack handler; and
a rack having a rack body, the rack body having:
   a) a bottom surface;
   b) a top opposite the bottom along a vertical direction;
   c) a receptacle that extends from the top toward the bottom along the vertical direction, the receptacle sized to receive a sample collection unit;
   d) a first side;
   e) a second side opposite the first side along a horizontal direction;
   f) a first interior having a length that extends from the first side to the second side along the horizontal direction and a width that extends from the bottom toward the top along the vertical direction, the length of the first interior surface being greater than the width of the first interior surface; and
   g) a second interior surface having a length that extends from the first side to the second side along the horizontal direction and a width that extends from the bottom toward the top along the vertical direction, the length of the second interior surface being greater than the width of the second interior surface, the second interior surface being opposite to the first interior surface so as to at least partially define a slot along the bottom,
   wherein at least one of the first interior surface and the second interior surface is non-linear along the length thereof to form an interference groove in the slot, and
   wherein the slot and the interference groove are sized to engage a portion of the rack handler.

12. The system of claim 11, wherein the sample collection unit is a plurality of sample collection units, wherein the receptacle is a plurality of receptacles.

13. The system of claim 11, wherein the first interior surface has a first portion and a second portion that is angularly offset with respect to the first portion so as to define the interference groove that engages a portion of a rack handler.

14. The system of claim 13, wherein the first and second portions of the first interior surface intersect to define a first angle, wherein the first angle is less than 180 degrees.

15. The system of claim 13, wherein the interference groove is a first interference groove, wherein the second interior surface has a first portion and a second portion that is angularly offset with respect to the first portion of the second interior surface so as to define a second interference groove that engages the portion of a rack handler.

16. The system of claim 15, wherein the first and second portions of the second interior surface intersect to define a first angle, wherein the first angle is less than 180 degrees.

17. The system of claim 15, wherein the first interior surface defines a third portion that is angularly offset from the first and second portions of the first interior surface, wherein the second interior surface defines a third portion that is angularly offset from the first and second portions of the second interior surface, wherein the third portion of the first interior surface is substantially parallel to the third portion of the second interior surface.

18. The system of claim 11, further comprising a first end and a second end opposite the first end along a longitudinal direction that is perpendicular to the vertical direction, wherein the slot is closer to the first end than to the second end.

* * * * *